(12) United States Patent
Patire

(10) Patent No.: US 6,456,671 B1
(45) Date of Patent: Sep. 24, 2002

(54) DECISION FEEDBACK PHASE TRACKING DEMODULATION

(75) Inventor: Anthony D. Patire, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/193,894

(22) Filed: Nov. 18, 1998

(51) Int. Cl.[7] .............................................. H04L 27/14
(52) U.S. Cl. ...................................... 375/325; 375/323
(58) Field of Search ................................ 375/325, 226, 375/346, 347, 348, 323

(56) References Cited

U.S. PATENT DOCUMENTS

| | | | |
|---|---|---|---|
| 5,497,400 A | * 3/1996 | Carson et al. | 327/233 |
| 5,692,015 A | * 11/1997 | Higashi et al. | 375/340 |
| 5,729,558 A | * 3/1998 | Mobin | 714/795 |
| 5,901,185 A | * 5/1999 | Hassan | 375/346 |
| 6,178,194 B1 | * 1/2001 | Vasic | 375/136 |
| 6,304,624 B1 | * 10/2001 | Seki et al. | 375/130 |

* cited by examiner

*Primary Examiner*—Stephen Chin
*Assistant Examiner*—David B. Lugo
(74) *Attorney, Agent, or Firm*—McAndrews, Held & Malloy, Ltd.

(57) ABSTRACT

The present invention provides a method and apparatus 200 for phase tracking coherent detection in a communication system. The method provides receiving a waveform which carries information including both phase reference information and data information. The received waveform is phase-rotated by a phase offset estimate. Phase reference information and data information is extracted from the phase-rotated received waveform. A phase offset estimate is calculated based on the extracted phase reference information, extracted data information, and the received waveform. The apparatus 200 provides a phase rotator 206 for phase-rotating an received waveform by an input phase offset estimate. A data detector 210 is provided which extracts phase reference information and data information from the phase-rotated version of the received waveform. A phase correction angle calculator 214 is provided to calculate the phase offset estimate based on the extracted phase reference information, the extracted data information, and the received waveform.

22 Claims, 2 Drawing Sheets

DECISION FEEDBACK PHASE TRACKING DEMODULATION

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

The present invention generally relates to coherent detection. More specifically, the present invention relates to tracking the absolute phase of a received waveform for coherent detection in a phase or frequency modulated communication system where the transmitted waveform consists of both phase reference symbols and data symbols.

Phase modulation ("PM") is widely used in communication systems. In phase modulation schemes, data is represented by either the absolute phase of the waveform or by changes in the phase of the waveform. One reason for the popularity of PM is the robustness of PM with respect to additive white Gaussian noise. Common examples include Binary Phase Shift Keying ("BPSK"), Quadrature Phase Shift Keying ("QPSK"), and Gaussian Minimum Shift Keying ("GMSK"). QPSK, for example, represents two bits of information (which may assume a total of four different values) in every symbol. A symbol consists of a phase shift by one of four possible phase shift values. The phase shift values are typically chosen to be plus/minus 45 degrees and plus/minus 135 degrees.

As the demand for communication bandwidth rises, the concern over efficient use of available bandwidth similarly rises. GMSK has been chosen by many because of its relatively efficient use of bandwidth. In GMSK, symbols are represented by gradual changes in phase which result in a power spectral density that rapidly falls off. This allows GMSK channels to be packed relatively efficiently into a given frequency band.

The scenario of interest involves modulation schemes that map information to the absolute phase of the waveform. As such, phase shift values are measured with respect to some reference. In order for a receiver to extract data from the received waveform, the phase shift values relative to the reference must be known. A receiver, therefore, needs to have knowledge of the phase reference. The transmitted waveform may contain symbols whose express purpose is to provide the receiver with explicit phase reference. For example, the GMSK waveform, as defined in the Advanced EHF Waveform Functional Description includes a specification for transmitting both phase reference symbols and data symbols. A receiver may then extract the absolute phase directly from the phase reference symbols.

Typically, phase lock loops or similar circuits with local oscillators are utilized in the process of signal channelization and detection. In some cases, the local oscillators may be used to provide phase references to data detection circuitry. Data detection circuitry may even be able to assert control over the local oscillators once more is known about the true phase reference. However, access to local oscillators may not always be practical. In some communications systems, the local oscillators may be set to specific frequencies or may be too slow to react to incoming phase reference information. In addition, the local oscillators may be used exclusively to extract the baseband waveform from an intermediate frequency, while the task of extracting both phase reference and data decisions from the baseband waveform falls on independent circuitry. To this end, methods have been developed to determine the absolute phase of the received waveform based on phase reference symbols. However, the methods that have been developed thus far focus on determining the absolute phase using only the phase reference symbols. Such methods fail to take advantage of additional phase reference information that may be obtained from the data symbols, and thus do not track the absolute phase of the received waveform as well as they potentially could.

A need exists for a coherent detection system that is capable of achieving a better phase reference than systems which utilize only phase reference symbols.

SUMMARY OF THE INVENTION

It is an object of the present invention to provide an improved scheme for tracking the absolute phase of a received waveform in a communication system.

It is another object of the present invention to provide an improved scheme for tracking the absolute phase of a received waveform in a coherent detection system which utilizes both phase reference symbols and data symbols contained in the waveform.

It is still another object of the present invention to provide an improved scheme for tracking the absolute phase of a received waveform in a coherent detection system in which a nominal waveform is generated from the detected data and is fed back and compared to the received waveform to determine the necessary amount of phase correction.

A preferred embodiment of the present invention provides a method and apparatus for coherent detection including tracking the phase of a received waveform containing both phase reference symbols and data symbols. The received waveform is phase-rotated by a phase offset estimate. Data decisions are extracted from the phase-corrected version of the received waveform. A nominal waveform is generated based on the data decisions resulting from the phase-corrected version of the received waveform. A phase measurement is generated from the difference in phase between the received waveform and the nominal waveform. The received waveform is phase-rotated by the phase offset estimate which is calculated from the phase measurements.

The apparatus provides a phase rotator for phase-rotating the received waveform by the phase offset estimate. A data detector is provided which extracts data decisions from the phase-corrected version of the received waveform. A waveform modulator is provided to generate a nominal waveform based on the data decisions generated from the data detector. A buffer is provided to time-align the received waveform with the nominal waveform. A phase error signal calculator is provided to generate a measurement of the difference between the phase of the nominal waveform and the phase of the received waveform. A phase correction angle calculator is provided to estimate the phase offset from the phase measurements.

DETAILED DESCRIPTION OF THE PREFERRED EMBODIMENT

Figure 1:
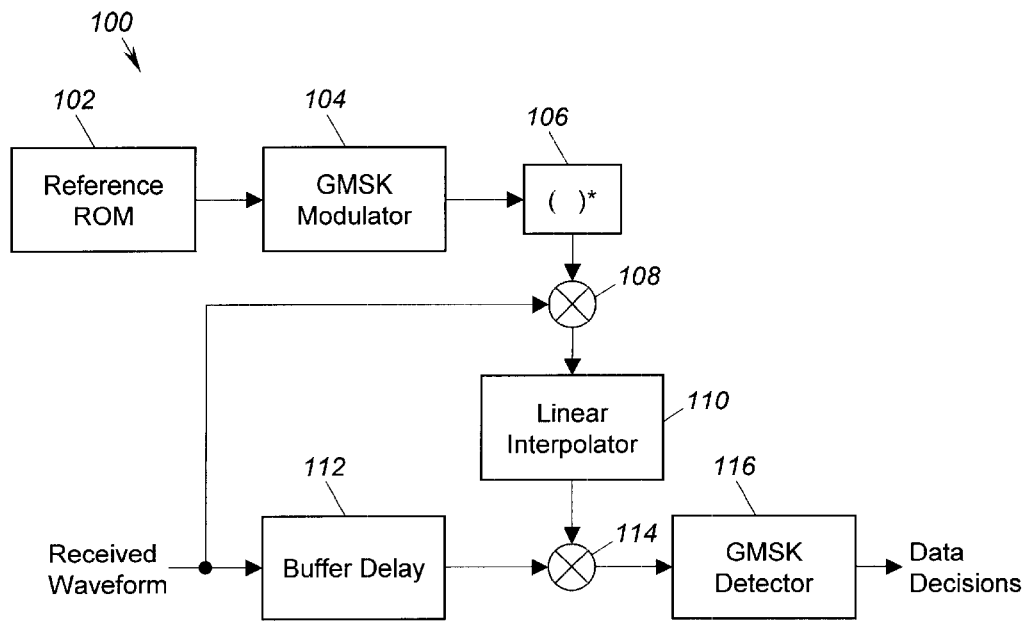
FIG. 1 illustrates a phase tracking coherent detection system utilizing linear interpolation of the phase reference measurements provided by the phase reference symbols to establish a phase reference estimate.

One method for extracting the absolute phase from a received waveform is to use linear interpolation of phase measurements generated from phase reference symbols interspersed throughout the transmission. FIG. 1 illustrates an example of a GMSK data detector 100 with a linear interpolated phase reference estimator. Reference symbols may be sprinkled throughout the transmitted sequence in a predetermined manner. For this example, there is a reference symbol sequence at the beginning and end of each block of data symbols. The reference ROM 102 stores the bit sequences corresponding to the known patterns of the phase reference symbols. Before the arrival of the data block, the GMSK modulator 104 uses the reference ROM 102 output to generate the expected pattern of phase reference symbols. The conjugate of the expected pattern of phase reference symbols is generated by the complex conjugator 106. Note that FIG. 1 is used to describe the correct functional flow, and is not intended to suggest a hardware realization. The complex conjugator 106 output is multiplied by the received waveform by the multiplier block 108. The results of the complex multiplication constitute a set of phase offset measurements. The phase offset measurements are input to the linear interpolator 110. The linear interpolator 110 computes a phase offset estimate from the set of phase offset measurements. At the end of the data block, a second received pattern of phase reference symbols is compared to a second expected pattern of phase reference symbols. As before, the comparison results in a phase offset estimate. Given a phase offset estimate at both the beginning and end of the data block, the linear interpolator 110 calculates a phase offset estimate for the duration of the data block. While the linear interpolation of the phase reference estimate is being calculated for a data block, the received waveform is delayed by the buffer 112 to allow the linear interpolator time to make its estimated phase correction calculation. The delayed version of the received waveform is derotated by multiplying it by the complex conjugate of the linearly estimated phase during the duration of the data block. The multiplication is performed by the multiplier 114. The delayed and derotated waveform output from the multiplier 114 is then sent to a GMSK data detector 116 which generates the data decisions.

The linear interpolation method just discussed explicitly calculates a phase correction at the beginning and at the end of each data block where phase reference symbols reside. However, it only provides a linearly interpolated estimate of the phase correction. In some cases this linearly estimated phase correction is adequate. However, we can achieve superior performance at a small cost to implementation complexity.

Figure 2:
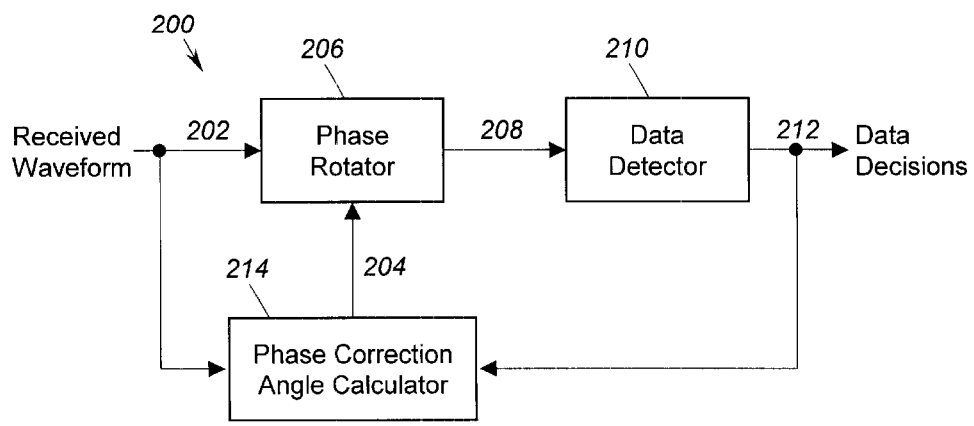
FIG. 2 illustrates a high level phase tracking coherent detection system according to a preferred embodiment of the present invention.

FIG. 2 illustrates a high level phase tracking coherent detection system 200 according to a preferred embodiment of the present invention. The received waveform 202 and the phase offset estimate 204 are input to a phase rotator 206. The purpose of the phase rotator 206 is to phase rotate the input received waveform 202 by the phase offset estimate 204, thereby providing a phase-corrected version of the received waveform 202. The phase-corrected waveform 208, output from the phase rotator 206, is input to a data detector 210.

The purpose of the data detector 210 is to generate data decisions from the phase-corrected waveform 208. The output 212 of the data detector 210 contains data decisions, which may take the form of a stream of bits. In the specific case of a GMSK data detector, the output 212 of the data detector 210 may take the form of a stream of bits (or chips) comprising phase reference bits and data bits. The data decisions from the output 212 of the data detector 210 are forwarded to some external receiving entity. The data decisions from the output 212 of the data detector 210 are also fed back to an input of the phase correction angle calculator 214.

The phase correction angle calculator 214 completes the data decision feedback loop by calculating the phase offset estimate 204 discussed above. The phase correction angle calculator 214 also receives the received waveform 202 as input. The phase offset estimate 204 is calculated based on the received waveform 202 and the data decisions fed back from the output 212 of the data detector 210.

Figure 3:
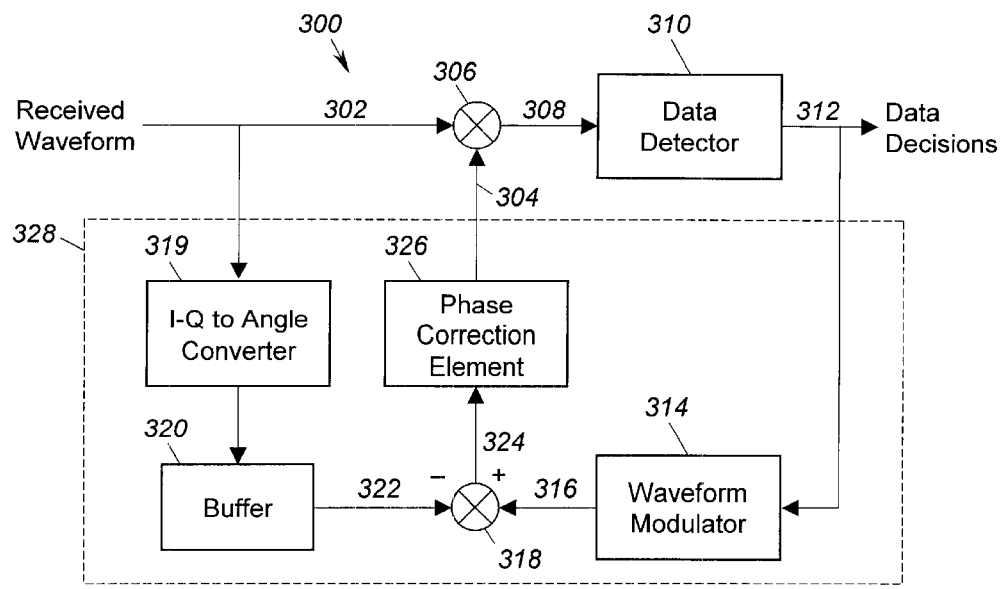
FIG. 3 illustrates a phase tracking coherent detection system according to a preferred embodiment of the present invention.

A more detailed illustration of a phase tracking coherent detection system 300 according to a preferred embodiment of the present invention is illustrated in FIG. 3. The phase correction angle calculator 214 of FIG. 2 corresponds to the phase correction angle calculator 328 of FIG. 3. The received waveform 302 and the offset estimate 304 are input to a phase rotator 306. The purpose of the phase rotator 306 is to phase rotate the received waveform 302 by the phase offset estimate 304, thereby providing a phase-corrected version of the received waveform 302. The phase rotator 306 preferably takes the form of a simple multiplier. The phase-corrected waveform 308, output from the phase rotator 306, is input to a data detector 310.

The purpose of the data detector 310 is to generate the data decisions from the phase-corrected waveform 308 applied to the input of the data detector 310. The output 312 of the data detector 310 contains data decisions which may take the form of a stream of bits (or chips). In the specific case of a GMSK data detector, the output of the data detector 310 preferably takes the form of a stream of bits comprising phase reference bits and data bits. The data decisions from the output 312 of the data detector 310 are forwarded to the next receiving entity. The data decisions from the output 312 of the data detector 310 are also fed back to an input of a waveform modulator 314.

The purpose of the waveform modulator 314 is to generate the nominal waveform that should have been received based on the data decisions generated by the data detector 310. If the received data decisions were made perfectly, the nominal waveform 316 from the waveform modulator 314 would be identical to the transmitted waveform. For the preferred embodiment illustrated in FIG. 3, the nominal waveform 316 is generated by the waveform modulator 314 in the angle domain. For the specific case of a GMSK modulator, the data decisions include both phase reference chips and data chips, and the output 316 of the waveform modulator 314 would be the nominal GMSK waveform for the data detector input. The output nominal waveform 316 from the waveform modulator 314 is applied to an input of an error signal generator 318.

The received waveform 302 is converted to the angle domain by an I-Q to angle converter 319 and applied to the input of a buffer 320. The received waveform 302 is ultimately compared with the nominal waveform 316.

However, there is a time delay between the time of arrival of the received waveform 302 and the time of generation of the nominal waveform 316. In order for an appropriate comparison to be made between the received waveform 302 and the nominal waveform 316, the two waveforms must be properly aligned in time. To this end, the buffer 320 is utilized to output a time-aligned version of the received waveform in the angle domain 322 to an input of the error signal generator 318.

The error signal generator 318 accepts as input the nominal waveform 316 from the waveform modulator 314 and the time-aligned angle domain version of the received waveform 322 from the buffer 320. In the preferred embodiment illustrated in FIG. 3, the error signal generator 318 computation is performed in the angle domain. Thus, the error signal generator 318 may take the form of a simple modulo subtracting element. In the case of a simple subtracting element, a perfect match between the nominal waveform 316 and the time-aligned angle domain version of the original waveform 322 would result in a zero output error signal 324. The phase offset measurement 324 output from the error signal generator 318 is applied to the input of a phase correction element 326.

Figure 4:
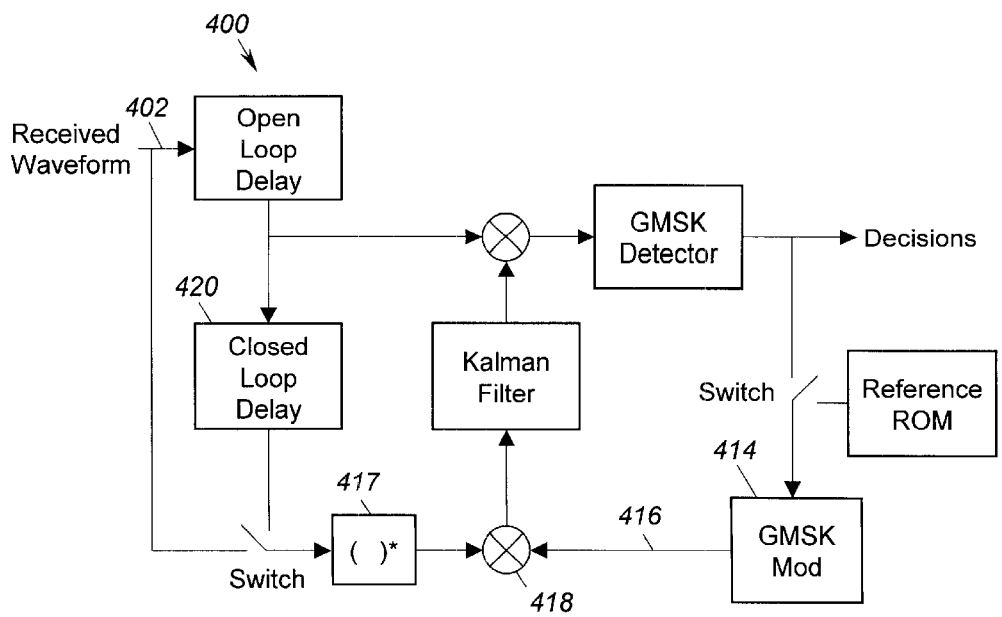
FIG. 4 illustrates a GMSK phase tracking coherent detection system according to an embodiment of the present invention.

For illustrative purposes, an alternate embodiment of a coherent detection system 400 according to the present invention is shown in FIG. 4. The received waveform 402 is received in the I-Q domain. The received waveform 402 is time-aligned by a delay element 420 and complex conjugated by a complex conjugator 417. The waveform modulator 414 outputs a nominal waveform 416 in the I-Q domain. The error signal generator 418 accepts as input the nominal waveform 416 from the waveform modulator 414 and the complex conjugated time-aligned version of the received waveform 402. Since the error signal generator computation is being performed in the I-Q domain, versus the angle domain computation in the preferred embodiment illustrated in FIG. 3, the error signal generator 418 may take the form of a multiplication element.

Referring back to the preferred embodiment illustrated in FIG. 3, the purpose of the phase correction element 326 is to make a phase offset estimate decision based on the phase offset measurement 324 from the error signal generator 318. The phase offset estimate 304 is then output to the phase rotator 306. The phase correction element 326 may take many forms. In one specific case, the phase correction element 326 may calculate the phase offset estimate 304 based on a weighted averaging scheme. The weighted averaging scheme may be an information-type-based weighted averaging scheme where the input phase offset estimate 324 is weighted with a first weight during periods of the waveform containing known reference symbols, and where the input phase offset measurement is weighted with a second weight during periods of the waveform containing data symbols. Optionally, the weighted averaging scheme may be a waveform-quality-based weighted averaging scheme where the weights used in calculating the weighted average are real-time variables and are adjusted in real-time based on signal quality measurements (e.g. signal-to-noise ratio). When the signal quality is poor, perhaps due to natural or manmade interference, the weights may be reduced. The phase correction element 326 may take the form of a common filter, such as a Kalman filter. Completing the data decision feedback loop, the phase offset estimate 304 output from the phase correction element 326 is applied to an input of the phase rotator 306.

The phase correction action performed by the data decision feedback loop continues for the duration of the received waveform 302.

In the discussion of the phase tracking demodulation system 300 according to a preferred embodiment of the present invention illustrated in FIG. 3, information passed between elements of the figure was named in general descriptive terms. The exact form of the information may vary. In a preferred embodiment of the present invention the original carrier 302, phase offset estimate 304, phase-corrected version of the received waveform 308, nominal waveform 316, time-aligned angle domain version of the received waveform 322, phase offset measurement 324, and the data decisions output from the data detector 310 take the form of a digital signals.

While particular elements, embodiments and applications of the present invention have been shown and described, it will be understood that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for coherent detection in a phase modulated communication system, the method comprising:

receiving a received waveform, said received waveform containing symbols comprising phase reference information and data information;

producing a phase-rotated waveform by phase-rotating said received waveform by a phase offset estimate;

extracting said phase reference information and said data information from said phase-rotated waveform; and calculating said phase offset estimate based on information comprising said phase reference information and said data information as obtained from said extracting step, and said received waveform.

2. The method for coherent detection of claim 1, wherein said step of calculating said phase offset estimate comprises generating a nominal waveform based on information comprising said phase reference information and said data information.

3. The method for coherent detection of claim 2, wherein said step of calculating said phase offset estimate further comprises calculating a phase offset measurement based on said nominal waveform and said received waveform.

4. The method for coherent detection of claim 3, wherein said step of calculating said phase offset estimate further comprises calculating said phase offset estimate based on said phase offset measurement.

5. A method for coherent detection in a communication system in which absolute phase information is necessary for the extraction of information from a waveform, the information comprising phase reference information and data information, the method comprising:

receiving a received waveform, said received waveform containing information comprising phase reference information and data information;

producing a phase-rotated version of said received waveform by phase-rotating said received waveform by a phase offset estimate;

extracting information from said phase-rotated version of said received waveform, said information comprising phase reference information and data information;

generating a nominal waveform based on said extracted information;

calculating a phase offset measurement based on said nominal waveform and said received waveform; and calculating said phase offset estimate based on said phase offset measurement.

6. The method for coherent detection of claim 5, wherein said step of calculating a phase offset measurement comprises subtracting a time-delayed version of said received waveform from said nominal waveform.

7. The method for coherent detection of claim 6, wherein said step of calculating said phase offset estimate comprises filtering said phase offset measurement.

8. The method for coherent detection of claim 7, wherein said step of filtering said phase offset measurement comprises calculating a weighted average of said phase offset measurement.

9. The method for coherent detection of claim 8, wherein:
said phase offset measurement comprises phase reference symbol sections and data symbol sections; and
said step of calculating a weighted average of said phase offset measurement comprises applying a first weighting coefficient to said phase reference symbol sections and applying a second weighting coefficient to said data symbol sections.

10. The method for coherent detection of claim 8, wherein said step of calculating a weighted average comprises using real-time variable weighting coefficients.

11. The method for coherent detection of claim 7, wherein said step of filtering said phase offset measurement comprises applying a Kalman filtering technique.

12. In a system for coherent detection of a waveform, the waveform comprising phase reference information and data information, a phase tracking coherent detection system comprising:
a phase rotator for phase-rotating an input received waveform by an input phase offset estimate, said phase rotator outputting a phase-corrected version of the received waveform;
a data detector for extracting information from the phase-corrected version of the received waveform, the information comprising phase reference information and data information, said data detector outputting extracted information;
a phase correction angle calculator for calculating the phase offset estimate based on information comprising the phase reference information and the data information as extracted by said data detector, and the received waveform.

13. The phase tracking coherent detection system of claim 12, wherein said phase correction angle calculator comprises a waveform modulator which receives the extracted information as input and outputs a nominal waveform based on the extracted information.

14. The phase tracking coherent detection system of claim 13, wherein said phase correction angle calculator further comprises a buffer, said buffer outputting a time-delayed version of the received waveform.

15. The phase tracking coherent detection system of claim 14, wherein said phase correction angle calculator further comprises a phase error signal generator, said phase error signal generator outputting a phase offset measurement based on the received waveform and the nominal waveform.

16. The phase tracking coherent detection system of claim 15, wherein said phase correction angle calculator further comprises a phase correction element which outputs the phase offset estimate based on the phase offset measurement.

17. The phase tracking coherent detection system of claim 16, wherein said phase correction element calculates the phase offset estimate using a weighted averaging scheme.

18. The phase tracking coherent detection system of claim 17, wherein said weighted averaging scheme is an information-type-based weighted averaging scheme.

19. The phase tracking coherent detection system of claim 17, wherein said weighted averaging scheme is a carrier-quality-based weighted averaging scheme.

20. The phase tracking coherent detection system of claim 16, wherein said phase correction element comprises a Kalman filter.

21. The method for coherent detection of claim 5, wherein said step of calculating a phase offset measurement comprises multiplying a time-delayed version of said received waveform and said nominal waveform.

22. The method for coherent detection of claim 21, wherein said step of calculating said phase offset estimate comprises filtering said phase offset measurement.

* * * * *